March 31, 1970     A. W. MARR, JR., ETAL     3,503,347
METHOD AND ELECTRICAL ARC APPARATUS
FOR INCINERATING TRASH AND GARBAGE Filed May 26, 1967     2 Sheets-Sheet 1

INVENTORS.
ANDREW W. MARR, JR.
DEWEY K. WALLACE,

BY *Berman, Davidson & Berman*

ATTORNEYS.

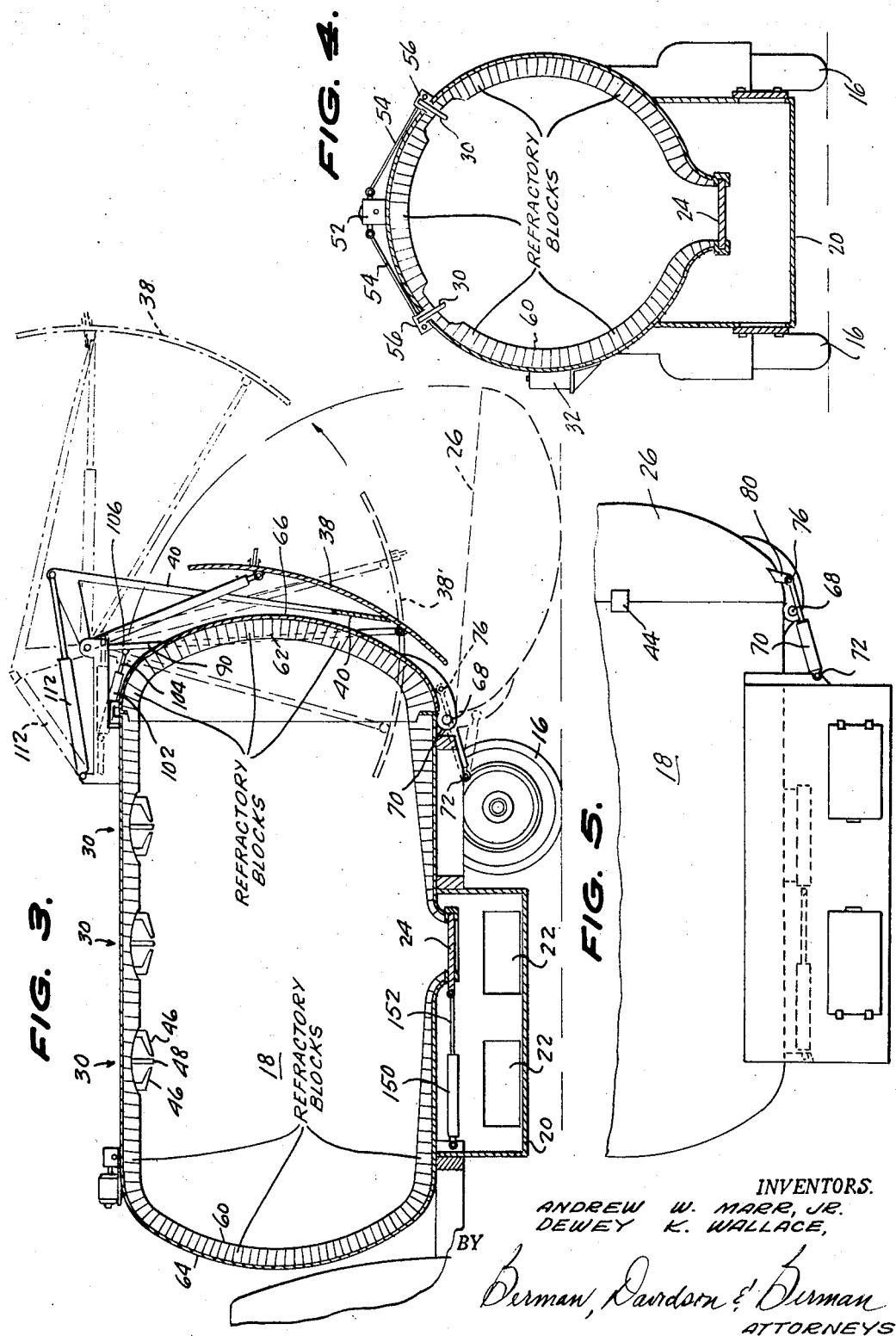

United States Patent Office 3,503,347
Patented Mar. 31, 1970

3,503,347
METHOD AND ELECTRICAL ARC APPARATUS FOR INCINERATING TRASH AND GARBAGE
Andrew W. Marr, Jr., and Dewey K. Wallace, Ardmore, Okla., assignors to Electrode Incinerators, Inc., a corporation of Delaware
Filed May 26, 1967, Ser. No. 641,557
Int. Cl. F23g 5/06, 5/10; H05b 7/18
U.S. Cl. 110—8                                       7 Claims

ABSTRACT OF THE DISCLOSURE

An incinerator for trash and garbage comprising a generally cylindrical, refractory lined combustion chamber; one end of said chamber being movable to act as an entrance gate; a plurality of arc-forming electrodes in spaced groups adjacent the upper surface of said chamber and means to energize said arcs.

---

As a method, said arc-forming electrodes are energized at predetermined spaced intervals of predetermined duration to reduce the weight and volume of solids in the chamber by destructive distillation.

One of the most severe problems in connection with the collection and ultimate disposal of trash and garbage lies in the inherently low density of the material collected so that even a vehicle or stationary plant with a reasonable volumetric capacity can be overloaded by a relatively small tonnage of waste. As used herein, the term "waste," unless otherwise specified, shall be taken to include both trash which is primarily paper along with cans and bottles and garbage which is primarily vegetable or animal wastes of high moisture content. So far as paper and the like is concerned, it is just as much vegetable matter as lettuce leaves and coffee grounds, but in practice at the time of collection or disposal has a far lower moisture content. In either case, the bulk of the matter to be disposed of is essentially vegetable where the moisture content ranges from 8 or 10 percent, in the case of trash composed primarily of paper, to as much as 60 or 70 percent in the type of waste that is customarily called garbage.

In any case, the disposable waste may be classified as carbohydrates having the very generic formula $C_n(H_2O)_m$. Carbohydrates on the application of heat readily break down into a carbon residue with the evolution of water vapor and when this occurs, there is a considerable reduction in volume from the original form to residual carbon. In ordinary combustion, the carbon content of the carbohydrates is oxidized to CO or $CO_2$ with the evolution of sufficient heat to break the combination of the carbon with the water and the result is complete conversion of the carbohydrate into steam and gases with only the relatively very small residual of ash which inevitably is present in all naturally formed organic compounds. It has been found that if carbohydrates are subjected to a quick application of 1,000° F. or more, there is a tendency toward extremely rapid decomposition into carbon and water vapor with rapid reduction in volume of solids. Such decomposition, however, is virtually unattainable by conventional incineration practices which utilize the heat of combustion of the carbon constituent in order to effect incineration.

The intense temperature of an arc is arrived at instantaneously on the separation of electrodes and it is the thesis of the present invention that subjecting trash instantaneously to exposure to such high temperatures will effect an extremely rapid decomposition of the trash with an equally sudden reduction in volume. A venting problem is thereby created but this can be met by conventional means, as will appear hereinafter. In this connection, the point is not combustion but rather, by thermal decomposition, to arrive at a prompt reduction in the volume of solids with which the "incinerator," whether mobile or stationary, is required to contend, thereby greatly increasing the capacity of a given installation from which, if desired, solid residues may be removed to a site for conventional combustion. Such a decomposition not only reduces volume but also reduces weight and serves to bring the problem of trash disposal within reasonable bounds of investment and the physical facilities within reasonable dimensions.

This invention is concerned primarily with a mobile waste collecting unit which may be self-powered so far as the arc aspects are concerned but, which also, in the same vehicle, may be provided with means for plugging into an electrical connection at predetermined points along the route of the vehicle so that the arcs may be operated from time to time as the vehicle progresses along its route and this may be done without depleting the fuel supply of the vehicle. Moreover, by limiting the duration of each subjection of the material to the arc to provide ample opportunity for venting between applications of the arc, the physical problem of venting while avoiding the generation of dangerous pressure within the chamber is minimized.

It is to be emphasized that the primary object of this invention is not to provide a substitute for incineration by combustion, but primarily to serve as an auxiliary to the combustion type of incinerators by greatly reducing the volume and weight of material to be handled by such conventional incineration installations.

The above and other objects will be made clear from the following detailed description when taken in connection with the annexed drawings, in which:

FIGURE 3 is a section on the line 3—3 of FIGURE 2;

FIGURE 4 is a section on the line 4—4 of FIGURE 1; and

FIGURE 5 is a partial side elevation showing the chamber of the preceding figures as a stationary installation.

Figure 1:
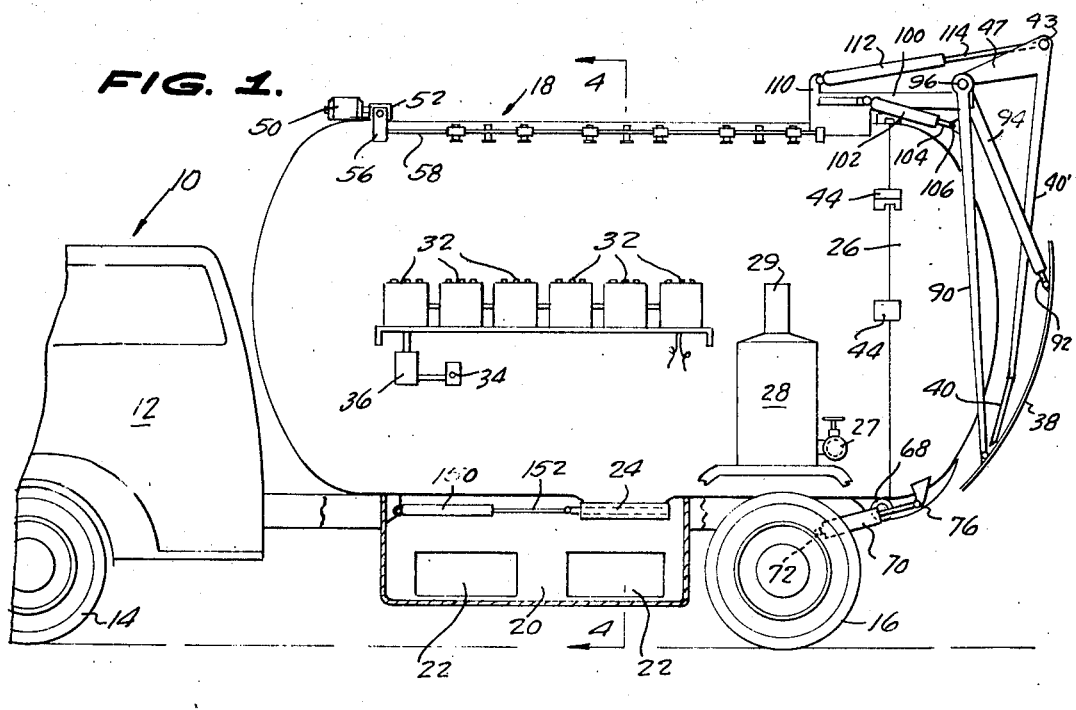
FIGURE 1 is a side elevation of a trash collection truck equipped with means to carry out the method of this invention.
Figure 2:
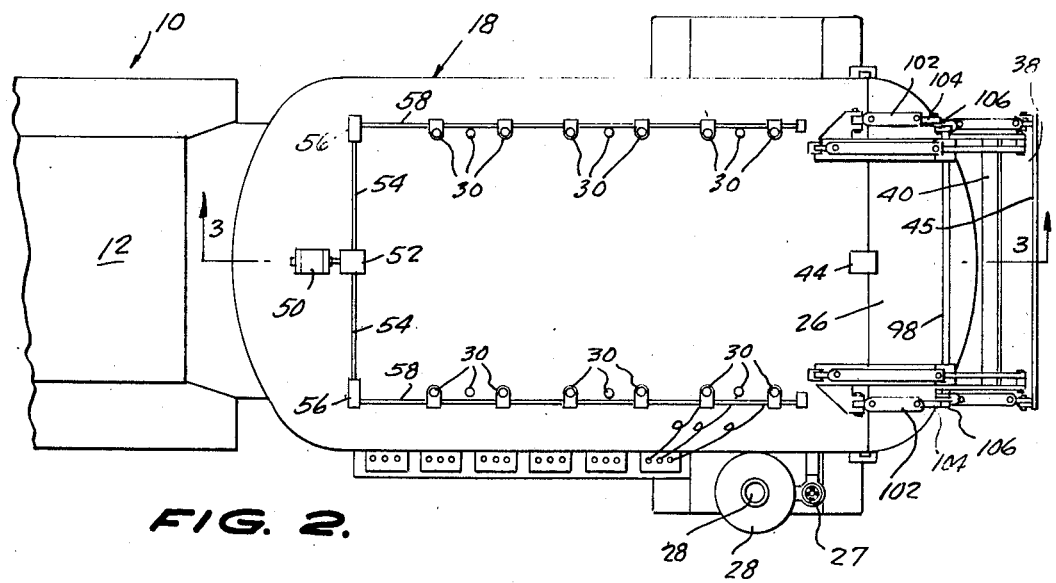
FIGURE 2 is a top plan view of the truck shown in FIGURE 1.

Referring now to FIGURES 1 and 2, the reference numeral 10 designates a truck chassis having the usual cab and engine arrangement 12 supported on and driven by the front wheels 14. The chassis is supported at the rear end by wheels 16 and is surmounted by a processing chamber designated generally as 18 and having an ash pit 20 with access doors 22 and a dumping gate 24 in communication with the chamber 18. The chamber 18 has a loading gate 26 and, mounted exteriorly on the truck adjacent the chamber 18 is a venting means generally designated 28.

Spaced along each side of the upper portion of chamber 18 are arc stations 30 suitably connecting by wiring, not shown, with a plurality of electrical arc-starters 32 arranged on one side of the combustion chamber 18.

If the chamber 18 and the arcs 30 are to be operated through the arc-starting units 32 by means of power generated by the power unit of the cab 12, the arcs will be started from the driver's seat or from any other suitable control location. If, however, it is desired to use an external source of power as by plugging into a fixture arranged along various poles or other supports on the route of the truck, a plug-in connection 34 with a control switch 36 are provided adjacent the starter unit 32, as best seen in FIGURE 1.

Adjacent the loading gate 26 there is mounted a trash guide 38 and a trash pusher 40, both operated by a system of hydraulic cylinders and pistons mounted on top of the combustion chamber 18 and which will be described in detail hereinafter. Manually operable clamps of conventional construction are provided at 44, as shown in FIGURES 1 and 2 and serve firmly to secure the gate 26 in closed position.

The construction of arc furnaces is a well known art and precise details for such construction form no part of the present invention. Only sufficient description of such units will be given as to place the units in their proper contacts. As is well known, an arc is formed when two conductors are brought into contact in a closed circuit and then are separated. The arc forms when separation occurs. As best shown in FIGURE 3, each of the units 30 contains opposed electrodes 46 and a central electrode 48. Under start-up conditions, the central electrode 48 is moved so as to bridge the gap between the electrodes 46. The circuit is then closed and the electrode 48 is withdrawn to produce a gap between it and both of the electrodes 46 with the resultant formation of an arc. This is accomplished by means of a motor 50 which, through a speed reducer 52, drives a pair of transverse shafts 54. The shafts 54 and gear boxes 56, containing beveled gears, not shown, serve to drive longitudinally extending shafts 58, each of which passes through a series of arc stations 30 on opposite sides of the chamber 18. The shafts serve to move the central electrodes 48 in and out of active position and thereby serve to establish the arc.

Under some circumstances and conditions of operation, it may be desired to provide for the arc stations 30 to be movable toward and from the center, or even the bottom of the chamber as the trash level may require. The problem of placing each unit 30 in a telescoping sleeve and providing means such as a piston and cylinder to accomplish such movement seems broadly so uncomplicated as not to require specific delineation here.

The arc-starting boxes 32 are individually connectable so that any combination of arc units 30 may be used depending on the level and disposition of trash collected within the chamber 18.

As shown in FIGURES 3 and 4, the chamber 18 has a refractory lining 60 and the gate 26 has a similar refractory lining 62. It will be noted from FIGURE 3 that the chamber and the gate 26 have the general design of a conventional pressure vessel. The refractory material 60 is confined by a conventional steel shell 64 and the refractory material 62 is confined by a similar shell 66. The ash gate 24 is at the coolest portion of the chamber and does not require such protection. If desired, the entire chamber may be preheated by conventional means such, for example, as an oil burner, not shown.

Gate 26 is pivoted at 68 either to the chamber 18 or to a portion of the truck chassis 12 and may be turned about the pivot 68 to the dotted line position shown in FIGURE 3. Opening and closing of the gate 26 is accomplished by a hydraulic piston and cylinder arrangement 70 which is pivoted at 72 to the chassis 12 and has a piston portion of the combination pivoted at 76 to a bracket 80 on the exterior of the gate 26. As many of these piston and cylinder link combinations as may be required may be provided across the width of the chassis 12. The control means are not important to the invention and are not illustrated.

While the gate 26 is closed, as shown in FIGURE 1, the trash guide 38 is in the position shown in FIGURES 1 and 2, and in full lines in FIGURE 3. The guide 38 itself, as shown, comprises an arcuate sheet of metal pivoted at one end to a link 90 and at its opposite end to a piston 92 which fits within a cylinder 94. Both piston 92 and the link 90 are pivoted at 96 to a cross shaft 98 (FIGURE 2) which has its opposite ends mounted in brackets 100 secured at opposite sides to the top of the chamber 18. Also pivoted to the brackets 100 are cylinders 102 with pistons 104 pivoted at 106 to the links 90. As a result of this arrangement, cylinders 102 and pistons 104 are able to raise the trash guide 38 to its dotted line position in FIGURE 3, thereby to clear the gate 26 for opening to its dotted line position.

In addition to trash guide 38, there is provided a trash pusher or feeder 40, previously noted. The trash pusher 40 which is simply a transverse blade, best seen in FIGURE 2, is secured at its ends to the arms 40' of a pair of bell cranks 41 which are pivoted at 43 to a transverse shaft 45, said bell crank 41 having arms 47 pivoted at 96 to the brackets 100. At the rearward end of the brackets 100 are upstanding arms 110 to which are pivoted piston cylinders 112 having pistons 114 which have their free ends pivoted to the cross rod 45.

By the foregoing arrangement, the links 40', with the trash pusher 40, may be drawn up to the dotted line position of FIGURE 3 to permit opening of the gate 26, then may be lowered to approximately the position shown in FIGURE 1. The trash guide 38, following opening of the gate 26, will be lowered to the dotted line position 38', shown in FIGURE 3, and while in this position trash deposited on the guide 38 may be swept from the guide 38 into the chamber 18 by oscillation of the pusher 40 under control cylinder 112. The various pistons and cylinders thus far described are under individual manual control though, of course, the precise cycling can be taped or otherwise programmed for automation. Such controls and such automation are so commonplace today that specific illustration is not deemed necessary.

FIGURE 5 simply shows the chamber 8 resting on the ash pit 20 which in turn rests on a fixed foundation, not shown. In a fixed position, the various controls of the trash guide 38 and the trash sweep 40 are distinctly optional. The ash gate 24, as shown in FIGURES 1 and 3, is under the control of a cylinder 150 and its piston rod 152.

As is well known, the temperature at the center of of an electric arc probably exceeds 6,500° F. which means that even at a reasonable distance from the arc, a surface exposed to the radiation may reach a temperature of 1,000° F. The temperature of the surface receiving the radiation, in this case, the surface of the trash, is the one with which the present invention is concerned. Once approximately 1,000° F. is reached in almost any natural organic matter, the composition of the type above noted takes place and the rate at which it takes places depends on the temperature. At 2,500° F., for example, the decomposition is so rapid as to be almost instantaneous. Since the decomposition is exceedingly rapid and results in a conversion of the major portion of a solid into gases and since the capacity of the chamber necessarily is limited, continuous operation of the arcs could be dangerous if the venting means were overloaded by the products of decomposition. For this reason, it is proposed to operate the arcs for relatively brief intervals predetermined with respect to the available space within the chamber and the temperature at point of impact of the radiation upon the trash. The arcs are then shut down for a predetermined interval to allow orderly removal of the gases generated by decomposition of the trash. These precise intervals must be determined empirically for each chamber and the trash level of which it is operating, but this represents no insurperable obstacle or research project for anyone skilled in the art.

A shown in FIGURES 1 and 2, 28 generally indicates a venting device mounted at the side of the chamber and having an output stack 29 and an input line 27. The unit 28 may contain such blowers and/or filters as may be required to extract the combustion products and discharge them to the atmosphere in as harmless a condition as possible. Since the combination of such blowers and filters represents, in itself, a well-developed art, it is not deemed necessary to discuss the details here.

While certain details of construction have been disclosed herein, numerous alterations in such details doubtless will occur to those skilled in the art. It is not, therefore, intended to limit this invention to the precise details disclosed but only as set forth in the subjoined claims.

What is claimed is:

1. A method of attenuating the weight and volume of collected, largely organic, waste comprising: confining such waste within an insulated chamber; subjecting the confined waste for predetermined periods of time, and at predetermined, time-spaced intervals, to radiant heat generated by an electric arc at temperatures, on the surface of the waste, of from about 1000° F. to about 6,000° F. to effect chemical decomposition of at least a portion of the waste, and venting the gases thereby produced to prevent undue pressure rise within said chamber.

2. Apparatus for attenuating the weight and volume of collected, largely organic, waste comprising: a thermally insulated chamber to contain such waste; at least one set of electrodes in the upper portion of said chamber and insulated therefrom, electrical energizing means for establishing an arc between said electrodes to subject the waste therein to radiant heat and to bring the surface of the waste to a temperature of from about 1000° F. to about 6000° F. to decompose such waste, presettable means for controlling the frequency of establishment of said arc, timer means for controlling the duration of said arc, and means for venting gases resulting from said decomposition from said chamber.

3. Apparatus according to claim 2, including means to adjust said arc toward and from the trash level in said chamber.

4. Apparatus according to claim 2 in which said chamber is mounted on a vehicle.

5. Apparatus according to claim 4, in which one end of said chamber is movable away from said chamber to form a trash entrance.

6. Apparatus according to claim 5, including a trash guide movable into registry with the bottom of said chamber and a trash sweep movable across said trash guide to sweep trash deposited on said guide into said chamber.

7. Apparatus according to claim 6, including power means to move said chamber, power means to operate said trash guide and power means to operate said trash sweep.

References Cited
UNITED STATES PATENTS

| | | | |
|---|---|---|---|
| 988,862 | 4/1911 | Conley | 219—385 |
| 1,293,141 | 2/1919 | McGary | 4—131 |
| 2,744,477 | 5/1956 | Hartley et al. | 110—8 |
| 2,977,903 | 4/1961 | Purdy | 110—8 |
| 3,173,388 | 3/1965 | Menrath et al. | 110—8 |

VOLODYMYR Y. MAYEWSKY, Primary Examiner

U.S. Cl. X.R.

219—383